Nov. 23, 1926.  
B. D. STEVENSON  
FRICTION CLUTCH  
Filed March 21, 1925  
1,608,143  
2 Sheets-Sheet 2

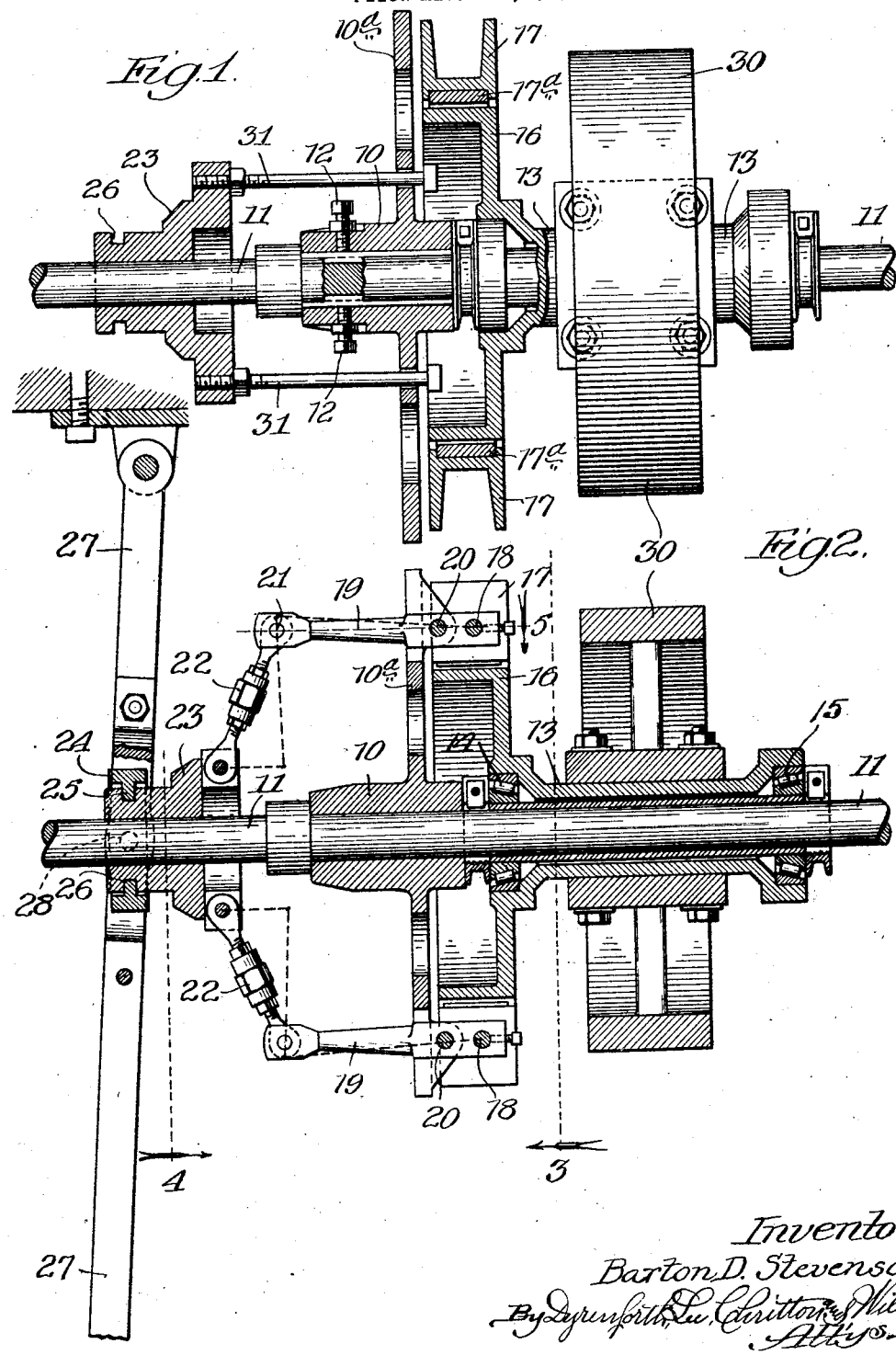

Inventor:  
Barton D. Stevenson,

Patented Nov. 23, 1926.

1,608,143

UNITED STATES PATENT OFFICE.

BARTON D. STEVENSON, OF HARVARD, ILLINOIS, ASSIGNOR TO HUNT-HELM-FERRIS & COMPANY, OF HARVARD, ILLINOIS, A CORPORATION OF ILLINOIS.

FRICTION CLUTCH.

Application filed March 21, 1925. Serial No. 17,202.

This invention relates to friction clutches and the like and is fully described in the following specification and shown in the accompanying drawing, in which:

Figure 1 is a partial longitudinal section on the line 1 of Fig. 4;

Fig. 2 is a similar view on the line 2 of Fig. 3;

Figure 3:
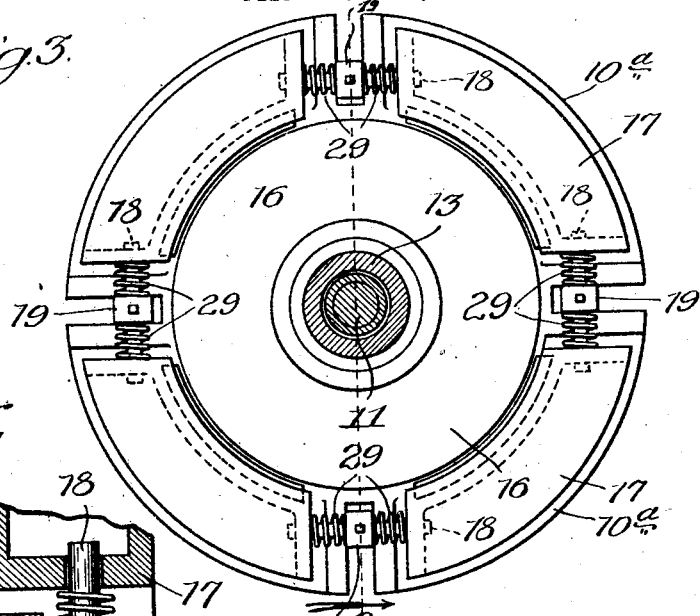
Fig. 3 is a transverse view on the line 3 of Fig. 2.

The clutch as illustrated comprises a body 10 secured to the shaft 11 by means of suitable keys and set screws 12.

A sleeve 13 is rotatably mounted upon the shaft 11 by means of suitable ball or roller bearings 14 and 15 and has a drum 16 adjacent the flange $10^a$ of the body 10.

A series of clutch elements 17 are disposed about the drum 16 and are pivotally mounted upon pins 18 which are carried upon levers 19 which in turn are fulcrumed upon pins 20 carried by the flange $10^a$. The outer ends of the levers 19 are pivotally connected by means of pins 21 and adjustable links 22 with the member 23 which slides upon the shaft 11 and which rotates therewith. A yoke 24 having pins 25 extending into the groove 26 in the member 23 is connected to a bifurcated operating lever 27 by means of pins 28 in a well known manner.

Figure 5:
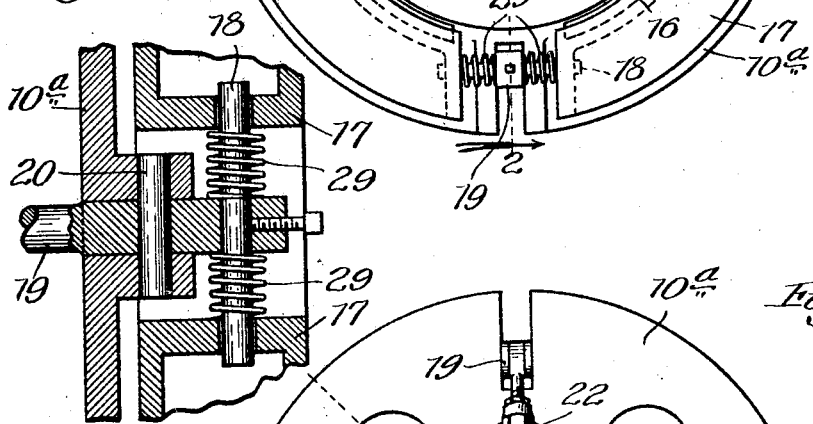
Fig. 5 is an enlarged partial section on the line 5 of Fig. 2.
Figure 4:
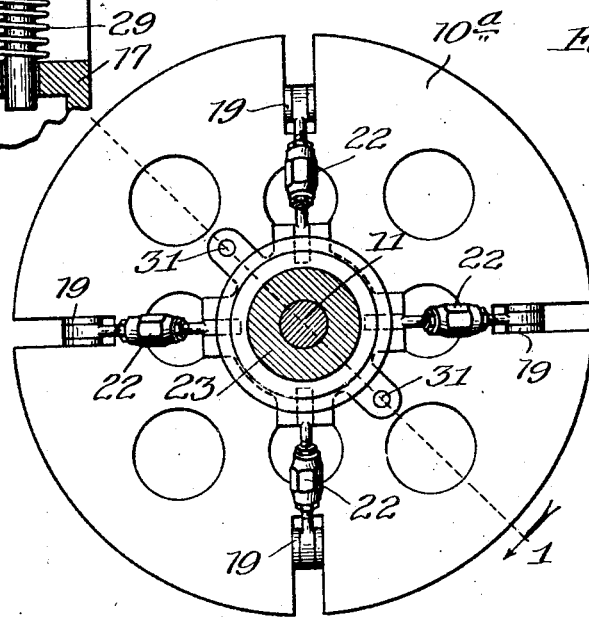
Fig. 4 is a similar view on the line 4 of Fig. 2.

The clutch elements 17 float upon the pins 18 and are pressed outwardly by means of springs 29 as shown in Figs. 3 and 5. A belt pulley 30 or the like is secured to the driving sleeve 13.

The figures show the clutch in a normally inoperative position so that the body 10 and parts associated therewith, such as the clutch elements 17, levers 18 and member 23 are rotated with the shaft 11. The action of centrifugal force tends to throw the clutch elements 17 outwardly thereby forcing the pins 21 toward the shaft 11 and forcing the member 23 farther away from the body 10 along the shaft 11. The stop members 31 secured to the member 23, pass through the flange $10^a$ and prevent the body 23 from being forced outwardly more than a predetermined amount. It will also be noted that this centrifugal action forces the clutch elements 17 away from the drum 16 so that there is no tendency of the clutch to grip unless pressure is applied to the lever.

To cause the clutch to operate, the operator grasps the lower end of the lever 27 and forces it to the right in Fig. 2, thereby moving the member 23 which, acting through the toggle levers or links 22, forces the outer ends of the levers 19 outwardly, thereby forcing the clutch elements 17 inward toward the drum 16. The inner bases of these elements are provided with suitable friction linings $17^a$.

To release the clutch, the lever 27 is forced to the left, thereby drawing the elements back to the position shown in Fig. 2 and raising the elements 17 which are forced outwardly by means of the springs 29 and by centrifugal force.

Thus a very simple and effective friction clutch is provided which is positive in its gripping and releasing action and one which will not readily get out of order.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a friction clutch, a body adapted to be secured to a shaft, a drum adapted to be rotatably mounted on the shaft adjacent said body, levers pivotally carried by said body, a clutch element between each adjacent pair of levers and pivotally carried thereby, said clutch elements being movable radially inward toward said drum to clutch the same, and means for moving the outer ends of said levers to move said clutch elements toward and from the drum.

2. In a friction clutch, a body adapted to be secured to a shaft, a drum adapted to be rotatably mounted on the shaft adjacent said body, levers pivotally carried by said body, a clutch element between each adjacent pair of levers and pivotally carried thereby, said clutch elements being movable radially inward toward said drum to clutch the same, a member movable longitudinally of said shaft, and a series of links connecting said member and said levers.

3. In a friction clutch, a body adapted to be secured to a shaft, a drum adapted to be rotatably mounted on the shaft adjacent said body, levers pivotally carried by said body, a clutch element between each adjacent pair of levers and pivotally carried thereby, said clutch elements being movable radially inward toward said drum to clutch the same, a member movable longitudinally of said shaft, a series of links connecting said member and said levers, and stop means for preventing the clutch elements from moving outwardly more than a predetermined amount under the action of centrifugal force.

BARTON D. STEVENSON.